Figure 1:
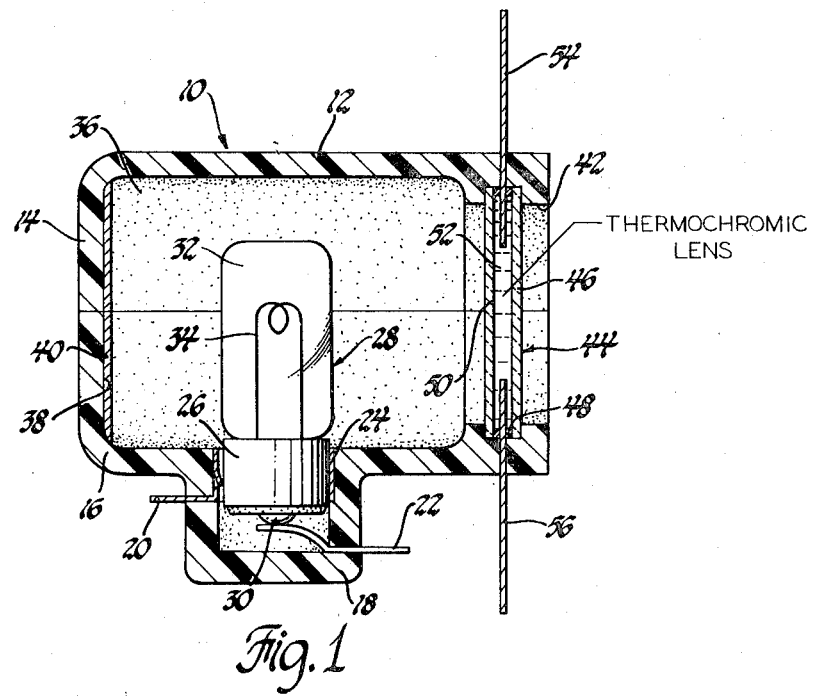

United States Patent

Jacobs

[15] 3,648,280
[45] Mar. 7, 1972

[54] THERMOCHROMIC LIGHT-FLASHING SYSTEM

[72] Inventor: James W. Jacobs, Dayton, Ohio
[73] Assignee: General Motors Corporation, Detroit, Mich.
[22] Filed: May 15, 1970
[21] Appl. No.: 37,663

[52] U.S. Cl. .................................340/366, 340/383
[51] Int. Cl. ....................................G08b 5/00
[58] Field of Search ............340/366, 383; 240/23, 92, 93, 240/106, 107; 313/112; 315/129; 350/160 P, 267, 312; 250/83

[56] References Cited

UNITED STATES PATENTS

| | | | |
|---|---|---|---|
| 3,249,930 | 5/1966 | Windsor | 340/366 |
| 3,441,513 | 4/1969 | Woodmansee | 350/312 |
| 3,443,859 | 5/1969 | Rogers | 350/312 |

*Primary Examiner*—Richard Murray
*Attorney*—W. S. Pettigrew and J. C. Evans

[57] ABSTRACT

In preferred form, a flasher device having a light source in an opaque case with a light-reflective inner surface. A thermochromic lens including cholesteric liquid crystals is located in an opening within said enclosure. It is heated by the light source and cooled by heat transfer fins. The cholesteric liquid crystals respond to changes in the temperature of the lens to traverse the entire visible spectrum from red to violet. The liquid crystal is colorless above and below its operating range. Changes in the ambient temperature around the enclosure and the changes in the color of the crystals will vary the temperature of the thermochromic lens to produce a repetitive flashing color play effect.

2 Claims, 2 Drawing Figures

Patented March 7, 1972

3,648,280

INVENTOR.
James W. Jacobs
BY
J.C. Evans
ATTORNEY

THERMOCHROMIC LIGHT-FLASHING SYSTEM

This invention relates to flasher devices and more particularly to flashers having a single light source and means responsive to energization of the light source to produce a flashing or changing color output.

In light warning or indicator systems various means have been used to produce a flashing output effect including the provision of thermally responsive bimetal switches that open and close to produce a pulsing output from either a visible white light source or a monochromatic light source.

Other warning systems include a mechanically operated reflective surface that is moved in a repetitive pattern with respect to monochromatic light sources to produce a flashing color play.

An object of the present invention is to provide a continuously varying output from a nonmechanical flasher device which includes a continuously energized single light source.

Still another object of the present invention is to produce a shift in color output in a flasher device having a single light source by means of a static lens of cholesteric liquid crystals exposed to the light source and means for varying the temperature condition of the crystals to cause a color shift therein through the visible color spectrum.

One flasher embodiment for accomplishing these objects includes an incandescent lamp energized to produce white visible light. This light directed and reflected into a thermochromic lens made of transparent substrates covered by cholesteric liquid crystals. As the lens is heated by the single light source through a predetermined temperature range the cholesteric crystals will produce a range of scattered light outputs to produce a varying color output from the lens. The lens is cooled by a plurality of heat dissipating fins that are in heat transfer relationship with the lens at one end thereof and when heat transfer relationship with the surrounding ambient at the opposite end thereof.

Further objects and advantages of the present invention will be apparent from the following description, reference being had to the accompanying drawings wherein a preferred embodiment of the present invention is shown.

Figure 2:
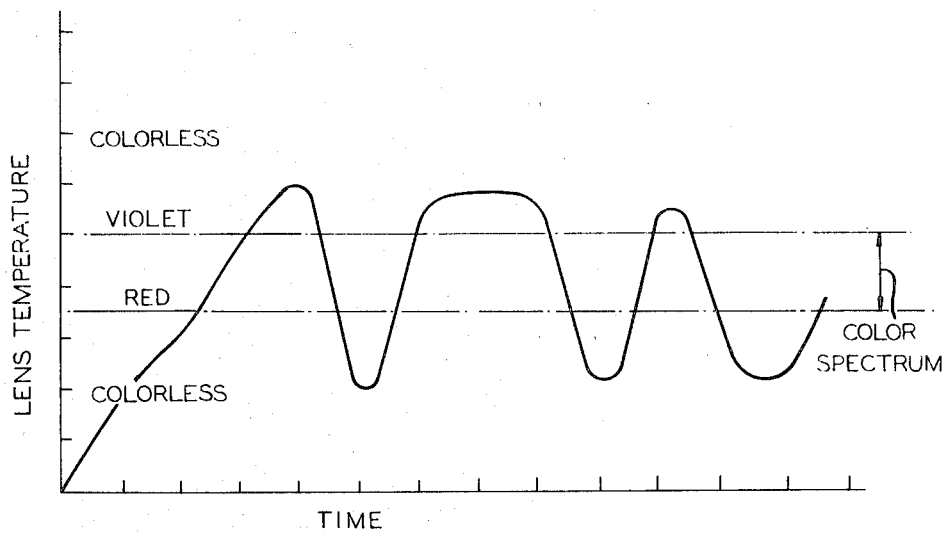

FIG. 1 is a view in vertical section of a flasher device including the present invention; and FIG. 2 is a graph showing the color change potential of the device of FIG. 1.

Referring now to the drawings in FIG. 1 a light-warning or flashing device 10 is illustrated that includes an opaque case or enclosure 12 having a top 14 and a base 16 which has a socket 18 depending therefrom. The socket 18 has a first and second electrical terminal 20, 22 directed therefrom which are adapted to be connected across a power source.

At the top of the socket 18 the terminal 20 is formed in a cylindrical shape 24 to receive the base 26 of an incandescent lamp 28.

A contact 30 on the base 26 is held against the terminal 22 in spring biased relationship therewith.

The lamp 28 more particularly includes an evacuated glass bulb portion 32 which encloses an electrically energizable filament 34 whereby when the terminals 20, 22 are connected across a power source the filament 34 will be energized into an incandescent range to produce a source of visible white light.

The lamp 28 more particularly is located within an open interior 36 formed between the top 14 and the base 16 of the case 12. The rear wall 38 of the interior space 36 is covered by a surface 40 of light-reflective material. The opposite wall of the case 12 is opened at 42 whereby light from the bulb 28 and reflected from the surface 40 is directed from the interior 36 to a point exterior the enclosure 12.

In accordance with certain principles of the present invention the constantly energized single light source represented by the lamp 28 serves as a heat source for a thermochromic lens 44 which fits across the opening 42 to be exposed to all light energy passing either directly from the lamp 28 or the reflective surface 40.

In the illustrated arrangement the lens 44 includes a transparent outer surface or face member 46 which is seated within a groove 48 formed in the upper and lower parts 14, 16 of the enclosure 12 around the opening 42 therein.

It also includes a transparent face or surface member 50 that is spaced apart from the member 46. This member also is seated within the groove 48 and likewise extends across the full planar extent of the opening 42.

Between the lens surfaces 46, 50 is a thin layer of cholesteric liquid crystals 52 which are representative of materials which change color in response to a change in temperature. These materials are derivatives of cholesterol, they flow like a liquid, and simultaneously exhibit the optical properties of a crystal by selectively scattering light.

Particular liquid crystal systems can be sensitive to temperature changes of 1° C. to produce color changes through the full visible spectrum. For example, a liquid crystal material may appear dark red at 30° C. under incandescent light; as the temperature is raised to 31° C., the color of the crystals will shift toward yellow, then green, then blue and then violet. The liquid crystal is colorless above and below the indicated temperature sensitivity range.

The pattern is reversible and will reappear over and over in a repetitive pattern to produce a flashing light effect in a completely static device, i.e., constantly energized light source, no mechanically operated reflectors, no pulsing switches, moving shutters or other like means for producing a visible flashing effect from the flasher device.

The flasher 10 also includes a plurality of elongated metallic heat transfer fins 54, 56 that serve to reduce the temperature of the lens 44 in accordance with the changes in the temperature or convective flow pattern of ambient air being directed across the outside of the case 12.

Preferably, the cholesteric liquid crystals are ones that have a temperature response curve within a few degrees Centigrade in order to get a rapidly flashing color change.

An example of a suitable material for this purpose is discussed in U.S. Pat. NO. 3,114,836, column 7, lines 22 through 38.

In the illustrated arrangement the surfaces 46, 50 serve the purpose of an infrared heat sink so as to raise the temperature of the crystals 52 so as to cause it to change from a red color to a violet color within the color change temperature range.

Outside this color change the temperature range, as shown in FIG. 2, the lens will become colorless. This along with the change in the cooling action of airflow across the fins 54, 56 will cause the temperature of the lens to be cycled through thereby to return through the violet and red phases in a repetitive manner.

The combination of continued heating from the single light source 28 and the cooling action of the fins 54, 56 will produce a continual rise and fall of colors in the spectrum from red to ultraviolet and back to red as shown in FIG. 2 whereby the constantly energized single visible white light source will be able to produce a variable color changing flashing effect from the device 10.

While the embodiments of the present invention, as herein disclosed, constitute a preferred form, it is to be understood that other forms might be adopted.

What is claimed is:

1. A thermochromic light-flashing system including an enclosure of opaque material, a lamp supported within said enclosure, means for continuously energizing said lamp across a power source to produce a constant light intensity from said lamp, an opening in said enclosure for passage of light from said lamp, a thermochromic lens in said opening exposed to constant light intensity from said lamp including means for scattering light in accordance with the temperature of said lens, said constant light intensity lamp heating said lens to increase its temperature to change its color, heat transfer fins on said lens responsive to convective cooling to reduce the temperature of said lens to return said lens toward its original color while said lens is exposed to the constant intensity light of said lamp, said means for scattering light responding to heating and cooling of said lens for producing a color flashing effect across said opening in said enclosure.

2. A thermochromic light-flashing system including an enclosure of opaque material, a lamp supported within said enclosure, means for continuously energizing said lamp across a power source for causing visible white light of a constant intensity to be directed therefrom, an opening in said enclosure for passage of light from said lamp, a thermochromic lens in said opening exposed to the constant intensity light of said lamp, said lens including means for varying light ray passage therethrough in accordance with the temperature of said lens, said lamp heating said lens to change its color, heat transfer fins on said lens responsive to convective cooling to cool said lens to return it to its original color when it is exposed to the constant intensity light of said lamp, said light ray varying means responding to heating and cooling of said lens for producing a color flashing effect across said opening in said enclosure.

* * * * *